United States Patent
Simske et al.

(10) Patent No.: US 9,977,829 B2
(45) Date of Patent: May 22, 2018

(54) COMBINATORIAL SUMMARIZER

(71) Applicant: HEWLETT-PACKARD DEVELOPMENT COMPANY, L.P., Houston, TX (US)

(72) Inventors: Steven J Simske, Fort Collins, CO (US); Malgorzata M Sturgill, Fort Collins, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 14/414,479

(22) PCT Filed: Oct. 12, 2012

(86) PCT No.: PCT/US2012/059917
§ 371 (c)(1),
(2) Date: Jan. 13, 2015

(87) PCT Pub. No.: WO2014/058433
PCT Pub. Date: Apr. 17, 2014

(65) Prior Publication Data
US 2015/0302083 A1 Oct. 22, 2015

(51) Int. Cl.
*G06F 17/30* (2006.01)
*G06F 17/27* (2006.01)

(52) U.S. Cl.
CPC ...... *G06F 17/30719* (2013.01); *G06F 17/279* (2013.01); *G06F 17/30011* (2013.01);
(Continued)

(58) Field of Classification Search
CPC ............. G06F 17/30684; G06F 17/248; G06F 17/279; G06F 17/2818; G06F 17/2827;
(Continued)

(56) References Cited

U.S. PATENT DOCUMENTS 5,638,543 A * 6/1997 Pedersen ........... G06F 17/30719
704/1
5,642,502 A * 6/1997 Driscoll .............. G06F 17/3064
(Continued)

OTHER PUBLICATIONS

R.M. Aliguliyev, "Automatic Document Summarization by Sentence Extraction",Institute of Information Technology, of the National Academy of Sciences of Azerbaijan, Baku, TOM 12, No. 5, 2007, Received for publication Oct. 25, 2006, pp. 1-11.*
(Continued)

*Primary Examiner* — Srirama Channavajjala (57) ABSTRACT

A combinatorial summarizer includes a plurality of summarization engines, a processor in selective communication with each summarization engine, and computer readable instructions executable by the processor and embodied on a tangible, non-transitory computer readable medium. Each summarization engine is to select a respective plurality of sentences, and generate a relative rank and an associated weight for each sentence of the respective plurality of sentences. The computer readable instructions include instructions to determine a combined weight for each sentence of each respective plurality of sentences. The combined weight is based upon the respective associated weight and a respective relative human rank for each sentence in a set of sentences, including all sentences of each respective plurality of sentences. The computer readable instructions further include instructions to determine a total weight for each summarization engine based, respectively, upon the combined weights for each sentence of each respective plurality of sentences.

20 Claims, 1 Drawing Sheet

(52) U.S. Cl.
CPC .. *G06F 17/30616* (2013.01); *G06F 17/30648* (2013.01); *G06F 17/30654* (2013.01); *G06F 17/30663* (2013.01)

(58) Field of Classification Search
CPC ......... G06F 17/30896; G06F 17/30893; G06F 17/30003; G06F 17/30067; G06F 17/30719; G06F 17/30864; G06F 17/30654; G06F 17/30648; G06F 17/30011; G06F 17/30663; G06F 17/30616
See application file for complete search history.

(56) References Cited

U.S. PATENT DOCUMENTS

| | | | | |
|---|---|---|---|---|
| 5,767,978 | A * | 6/1998 | Revankar | H04N 1/40062 358/296 |
| 7,292,972 | B2 | 11/2007 | Lin et al. | |
| 7,886,235 | B2 | 2/2011 | Bornstein et al. | |
| 8,171,026 | B2 | 5/2012 | Kawatani | |
| 8,176,418 | B2 | 5/2012 | McKeown et al. | |
| 8,195,654 | B1 * | 6/2012 | Riley | G06F 17/30864 706/12 |
| 9,015,153 | B1 * | 4/2015 | Zhang | G06F 17/28 707/723 |
| 2002/0052901 | A1 * | 5/2002 | Guo | G06F 17/27 715/247 |
| 2002/0138528 | A1 * | 9/2002 | Gong | G06F 17/27 715/254 |
| 2004/0002849 | A1 * | 1/2004 | Zhou | G06F 17/27 704/4 |
| 2004/0024752 | A1 * | 2/2004 | Manber | G06F 17/30675 |
| 2004/0068396 | A1 * | 4/2004 | Kawatani | G06F 17/3069 703/2 |
| 2005/0149853 | A1 * | 7/2005 | Naitou | G06F 17/30882 715/206 |
| 2006/0004561 | A1 * | 1/2006 | Zhang | G06F 17/3071 704/4 |
| 2007/0143101 | A1 * | 6/2007 | Goutte | G06F 17/30705 704/9 |
| 2007/0294283 | A1 * | 12/2007 | MacKay | G06F 17/2288 |
| 2008/0027926 | A1 * | 1/2008 | Diao | G06F 17/30719 |
| 2008/0109399 | A1 * | 5/2008 | Liao | G06F 17/30719 |
| 2010/0217592 | A1 * | 8/2010 | Gupta | G06F 17/279 704/236 |
| 2010/0287162 | A1 | 11/2010 | Shirwadkar | |
| 2011/0113027 | A1 * | 5/2011 | Shen | G06Q 30/0282 707/723 |
| 2011/0314041 | A1 * | 12/2011 | Drucker | G06Q 30/02 707/769 |
| 2012/0035912 | A1 * | 2/2012 | Litvak | G06F 17/30719 704/8 |
| 2012/0072859 | A1 * | 3/2012 | Wang | G06K 9/00442 715/764 |
| 2012/0240032 | A1 | 9/2012 | McKeown et al. | |
| 2014/0222834 | A1 * | 8/2014 | Parikh | G06F 17/30867 707/748 |

OTHER PUBLICATIONS

Mi Hwa Song et al., "A Multi-Classifier Based Guideline Sentence Classification System" Healthc Inform Res. Dec. 2011;17(4):224-231.*
Gupta, V. et al, "A Survey of Text Summarization Extractive Techniques", Aug. 2010.
Iason, Demiros et al, "Sentence-Based Text Summarization: Modelling and Evaluation" Proc of the 2nd Hellenic Conf of Artificial Intelligence, Apr. 11-12, 2002.
Wibisono, Y, et al, "Generating Indicative and Informative Summaries for Search Engine Results", Jun. 17-19, 2007.
Chin-Yew Lin: "ROUGE: A Package for Automatic Evaluation of Summaries", Proceedings of Workshop on Text Summarization 2004, Jul. 21, 2004 (Jul. 21, 2004), XP055099375.
European Patent Office. Supplementary European Search Report. dated Mar. 4, 2016, Application No. 12886445.
Hoa Trang Dang et al: "Overview of the TAC 2008 Update Summarization Task", First Text Analysis Conference, (Online) Nov. 17, 2008 (Nov. 17, 2008), XP055231910.
Peter Rankel et al: "Ranking Human and Machine Summarization Systems", Proceedings of the 2011 Conference on Empirical Methods in Natural Language Processing, Jul. 27, 2011 (Jul. 27, 2011), pp. 467-473, XP055231915.

\* cited by examiner

COMBINATORIAL SUMMARIZER

BACKGROUND

Summarizers are computer-based applications that analyze documents (e.g., text, html, email, etc.), extract main ideas or sentences from the analyzed documents, and arrange the extracted main ideas or sentences into a summary. Some summarizers enable the summary to be theme-oriented, structure-oriented, or concept-oriented. Different summarizers may provide a different summary for the same document.

BRIEF DESCRIPTION OF THE DRAWINGS

Features and advantages of examples of the present disclosure will become apparent by reference to the following detailed description and drawing, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to combinatorial summarizers.

When different summarizers provide different summaries, human evaluation of the different summaries may be used to rank the individual summaries. This approach provides a binary, qualitative datum that limits the outcome of the evaluation to the selection of one summarizer over another. In the examples disclosed herein, however, a combinatorial approach is utilized. In the combines quantitative method(s) for evaluating the summarizers with the advantages of qualitative human feedback. The combinatorial approaches disclosed herein enable the summarizers and their respective outputs to be combined together for significantly improved performance, accuracy, and summary robustness.

Examples of the combinatorial summarizer disclosed herein utilize the previously mentioned combinatorial method(s) to evaluate two or more summarization engines. The individual summarization engines analyze a document, and provide a summary output to a processor operatively connected thereto. In some examples, the summary outputs may be uniform in that each summarization engine is programmed to rank the same number of sentences from the document, but may be different in that the ranked sentences may vary from one summarization engine to another. In other examples, the summarization engines may be programmed to rank different numbers of sentences, and the processor may be programmed to crop the number of sentences ranked by each summarizer to any desirable number. The processor, executing computer readable instructions, utilizes these output summaries in conjunction with relative human ranking data for the same document in order to evaluate the summarization engines. The combinatorial summarizer and the combinatorial method disclosed herein provide a non-biased and quantitative approach for evaluating the summarization engines. In addition, some examples of the combinatorial method apply meta-algorithmic patterns, which combine at least some of the information from the various summary outputs in order to evaluate various combinations of the summarization engines.

Figure 1:
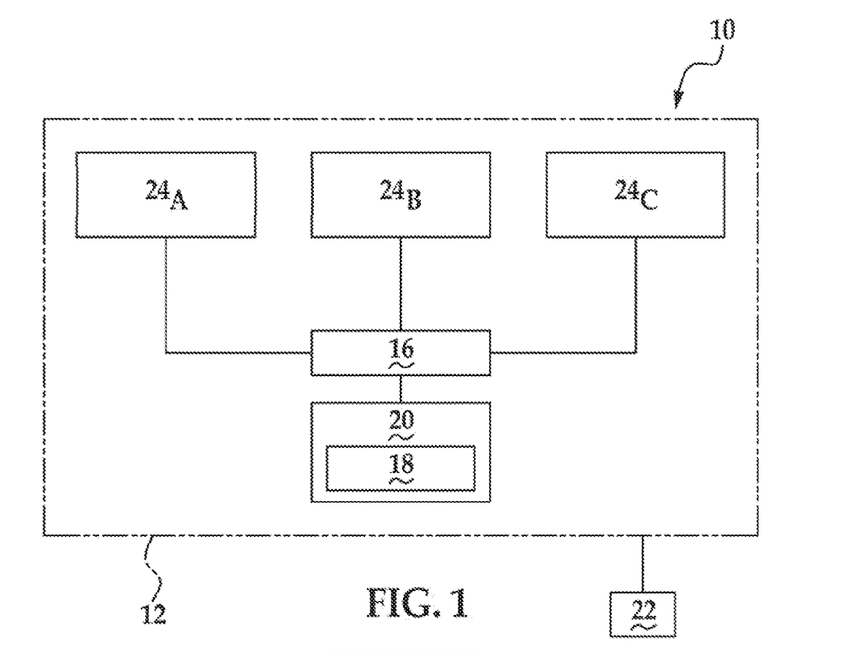
FIG. 1 is a schematic depiction of an example of a combinatorial summarizer.
Figure 2:
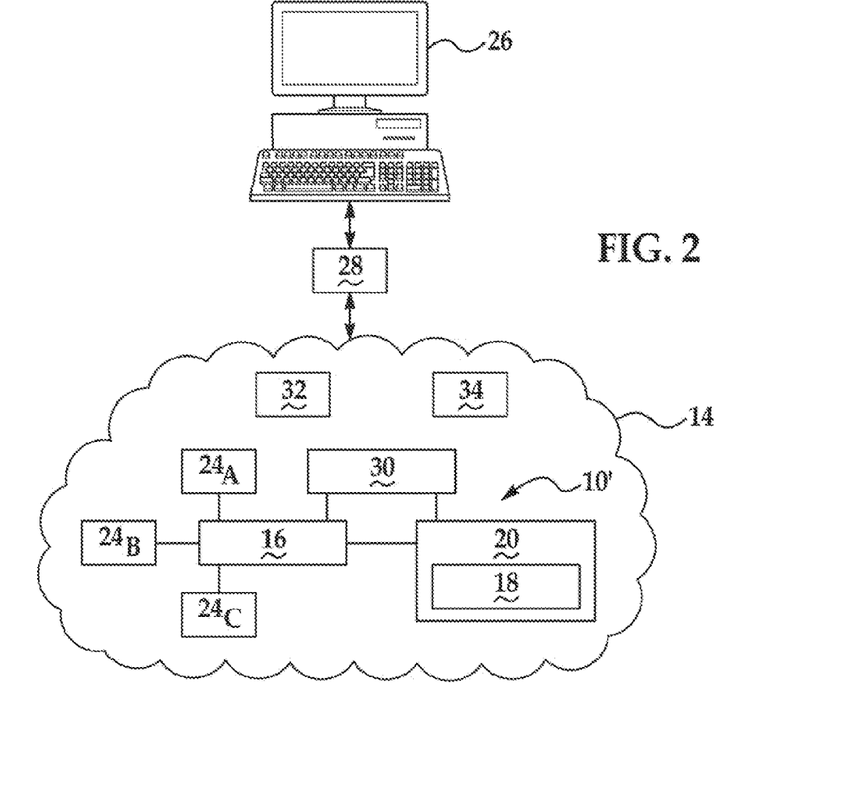
FIG. 2 is a schematic depiction of an example of the combine summarizer; implemented as part of a cloud computing system.

Referring now to FIGS. 1 and 2, examples of the combinatorial summarizer 10, 10' are shown. The combinatorial summarizers 10, 10' each include a combination of hardware and programming in order to perform examples of the combinatorial summarization methods disclosed herein. The hardware and programming may be part of a local computing system (e.g., reference numeral 12 in FIG. 1) or part of a cloud computing system (e.g., reference numeral 14 in FIG. 2), each of which will be discussed in further detail herein. In other instances, the hardware and programming may be part of a distributed computing system, a virtualized computing system, or a peer-to-peer computing system.

Hardware generally refers to processors (e.g., processor 16), servers, and other computer hardware systems. The processor 16 is capable of executing programming for performing steps of the combinatorial methods disclosed herein.

Programming generally refers to computer readable instructions 18 embodied on a non-transitory, tangible computer readable medium 20 that, when executed, carry out a specific function. Examples of the instructions 18 disclosed herein may be realized in any non-transitory, tangible computer readable media 16 for use by or in connection with an instruction execution system (e.g., computing systems 12, 14), such as a computer/processor based system, or an ASIC (Application Specific Integrated Circuit), or another system that can fetch or obtain the logic from computer readable media 20 and execute the instructions 18 contained therein.

The non-transitory, tangible computer readable media 20 may be any media that is capable of containing, storing, or maintaining programs and data for use by or in connection with the computing systems 12, 14. It is to be understood that the media 20 may be integrated in the sane device as the processor 16, or it may be separate from, but accessible to the respective computing system 12, 14 and processor 16. Examples of computer readable media 20 may include any one of many physical media such as, for example, electronic, magnetic, optical, electromagnetic, or semiconductor media. More specific examples of suitable, computer readable media 20 include a portable magnetic computer diskette such as floppy diskettes or hard drives, a random access memory (RAM), a read-only memory (ROM), an erasable programmable read-only memory (EPROM), or a portable CD, DVD, or flash drive.

Still further, the computer readable instructions 18 may be part of an installation package that can be executed by the processor 18 to implement at least some steps of the combinatorial summarization methods disclosed herein. In these instances, the medium 20 may be the previously mentioned portable medium, such as a compact disc (CD), a digital video disc (DVD or a flash drive; or the medium 16 may be a memory maintained by a server from which the installation package can be downloaded and installed on the computing system 12, in another example, the computer readable instructions 18 may be part of an application or applications already installed on the computing system 12. In this other example, the medium 20 may include integrated memory, such as the previously mentioned hard drive.

Referring now specifically to FIG. 1, the example of the combinatorial summarizer 10 is shown as a local computing system 12, which may be a standalone computing system and/or part of a network of computing system. The local computing system 12 may be any personal computer, portable computer, content server, a network PC, a personal digital assistant (PDA), a smart cellular telephone or any other computing device that is capable of performing the functions of the combinatorial summarizer 10 disclosed herein. The local computing system 12 is operatively connected to an input device 22, which may be a keyboard or a keypad, mouse, touchscreen, etc. which enables a user to input information into the computing system 12.

As shown in FIG. 1, the combinatorial summarizer 10 includes a plurality of summarization engines $24_A$, $24_B$, $24_C$. While three summarization engines $24_A$, $24_B$, $24_C$ are shown in FIG. 1, it is to be understood that any number of summarization engines $24_A$, $24_B$, $24_C$ may be part of the combinatorial summarizer 10. In the example shown in FIG. 1, each summarization engine $24_A$, $24_B$, $24_C$ is a separate computer program (i.e., set of computer readable instructions) that is executable by the processor 16. In this example, the summarization engines $24_A$, $24_B$, $24_C$ may be stored in the computing system 12 on any of the examples of the computer readable medium 20 discussed herein. In another example that is not shown, one or more of the summarization engines $24_A$, $24_B$, $24_C$ may be physically separate from the computing system 12, but in selective communication with the processor 16, which receives data (i.e., summary outputs) from the respective summarization engines $24_A$, $24_B$, $24_C$. In this example, the summarization engines $24_A$, $24_B$, $24_C$ may be on separate systems 12. In still another example, the summarization engines $24_A$, $24_B$, $24_C$ may be part of a is virtualized, or cloud computing system that the processor 16 of the local computing system 12 can operatively communicate with. For example, one summarization engine $24_A$ could be resident on a mobile device and connected to the processor 16 while the other summarization engines $24_B$ and $24_C$ are resident on other devices that are automatically or volitionally connected to the processor 16.

The execution of any of the summarization engines $24_A$, $24_B$, $24_C$ results in the analysis and summarization of a user-selected document (e.g., text, html, email, etc.). In the examples disclosed herein, each of the summarization engines $24_A$, $24_B$, $24_C$ summarizes the document and generates a respective summary output. Generating the summary output involves selecting a set number of sentences from the document and ranking each of the selected sentences from the most salient sentence to the least salient sentence. The rankings may vary from one summarization engine $24_A$, $24_B$, $24_C$ to the next depending, at least in part, on the programming. The number of sentences in the sets respectively selected by the summarization engines $24_A$, $24_B$, $24_C$ may be the same of different. In some examples, the processor 16 running computer readable instructions 18 may be programmed to crop the number of sentences from one or more summarization engines $24_A$, $24_B$, $24_C$ so that the total number of sentences provided by all of the summarization engines $24_A$, $24_B$, $24_C$ does not exceed the number of sentences in original document.

The summarization engines $24_A$, $24_B$, $24_C$ also associate each of the relative ranks with a weight. The weighting scheme may assign weights in inverse order to the rank, where the top ranked, or most salient sentence (e.g., sentence number 1 of 10) receives the highest weight, and the bottom ranked, or least salient sentence (e.g., sentence number 10 of 10) receives the lowest weight. Other weighting schemes may also be utilized. As an example, the 15 sentences selected as the most significant sentences may be ranked on a scale of 1-15, with 1 being the least significant sentence and 15 being the most significant sentence. In this example, the weighting scheme may multiple the ranks by a constant weight factor (e.g., a predetermined number, such as 10) so that the most significant sentence is associated with the highest weight, and the least significant sentence is associated with the lowest weight. In another example, the weights could be based on interval probability measures. In still another example, the summarization engines $24_A$, $24_B$, $24_C$ could provide their own confidence values, although the processor 16 running computer readable instructions 18 may be programmed to normalize these weights so the weighting is the same for each summarization engine $24_A$, $24_B$, $24_C$. When the processor 16 crops the number of sentences selected by any particular summarization engine $24_A$, $24_B$, $24_C$, new relative and absolute weights of the sentences that remain may be obtained.

It is to be understood that the set number of sentences to be selected and the weighting scheme are the same for each of the summarization engines $24_A$, $24_B$, $24_C$. As such, the summary outputs from the respective summarization engines $24_A$, $24_B$, $24_C$ are somewhat uniform. However, it is to be understood that the summary outputs may not be identical, at least in part because each summarization engine $24_A$, $24_B$, $24_C$ may select different sentences from the document as being the most salient sentences.

In an example, each summarization engine $24_A$, $24_B$, $24_C$ analyzes the text of an article containing 35 sentences. Each summarization engine $24_A$, $24_B$, $24_C$ includes computer readable instructions to select what it deems to be the 10 most significant sentences of the 35 sentences, computer readable instructions to generate a relative rank for each of the selected sentences (where the rank of 1 being the most significant and the rank of 10 being the least significant), and computer readable instructions to associate a particular weight with the ranked sentences (where the weight is the inverse of the rank). Examples of summary outputs from the three summarization engines $24_A$, $24_B$, $24_C$ for this example are shown below in Tables 1-3.

TABLE 1

Summary Output for Summarization Engine $24_A$

| Rank | Sentence Number in the Document | Weight |
|---|---|---|
| 1 | 4 | 10.0 |
| 2 | 7 | 9.0 |
| 3 | 3 | 8.0 |
| 4 | 14 | 7.0 |
| 5 | 25 | 6.0 |
| 6 | 9 | 5.0 |
| 7 | 1 | 4.0 |
| 8 | 33 | 3.0 |
| 9 | 19 | 2.0 |
| 10 | 35 | 1.0 |

TABLE 2

Summary Output for Summarization Engine $24_B$

| Rank | Sentence Number in the Document | Weight |
|---|---|---|
| 1 | 7 | 10.0 |
| 2 | 1 | 9.0 |
| 3 | 6 | 8.0 |
| 4 | 29 | 7.0 |
| 5 | 19 | 6.0 |
| 6 | 4 | 5.0 |
| 7 | 5 | 4.0 |
| 8 | 3 | 3.0 |

TABLE 2-continued

Summary Output for Summarization Engine $24_B$

| Rank | Sentence Number in the Document | Weight |
|---|---|---|
| 9 | 33 | 2.0 |
| 10 | 14 | 1.0 |

TABLE 3

Summary Output for Summarization Engine $24_C$

| Rank | Sentence Number in the Document | Weight |
|---|---|---|
| 1 | 1 | 10.0 |
| 2 | 14 | 9.0 |
| 3 | 4 | 8.0 |
| 4 | 3 | 7.0 |
| 5 | 7 | 6.0 |
| 6 | 19 | 5.0 |
| 7 | 25 | 4.0 |
| 8 | 30 | 3.0 |
| 9 | 9 | 2.0 |
| 10 | 24 | 1.0 |

The weights in each of Tables 1-3 sum to 55. Dividing by 55 normalizes the weights to 1.0. It may be desirable to normalize the weights in a similar manner when the summarization engines $24_A$, $24_B$, $24_C$ report different numbers of sentences, different weighting schemes, or when some of their sentences are cropped or dropped as more summarization engines $24_A$, $24_B$, $24_C$ are added to the overall set.

The processor 16 receives the output summary (including the relative rank and the associated weight) from each of the summarization engines $24_A$, $24_B$, $24_C$. The processor 16, running computer readable instructions 18, is capable of generating a set of sentences based upon the output summaries. In particular, the processor 16 compiles a list of all of the sentences respectively ranked by the summarization engines $24_A$, $24_B$, $24_C$. The set of sentences that is compiled is a complete list of the sentences that were ranked by any of the summarization engines $24_A$, $24_B$, $24_C$, whether a sentence was ranked by one of the summarization engines $24_A$, $24_B$, $24_C$ or more than one of the summarization engines $24_A$, $24_B$, $24_C$. For the previous example, the set of sentences would include 15 sentences, namely sentence numbers 1, 3, 4, 5, 6, 7, 9, 14, 19, 24, 29, 30, 33, and 35. The number of sentences included in the set of sentences may vary depending, at least in part, on the number of summarization engines $24_A$, $24_B$, $24_C$ the set number of sentences to be selected by each summarization engine $24_A$, $24_B$, $24_C$ and the number of sentences that are ranked by multiple summarization engines $24_A$, $24_B$, $24_C$. In some instances, the number of sentences provided by each summarization engine $24_A$, $24_B$, $24_C$ may be cropped/reduced until the number of unique sentences provided by the combination of the summarization engines $24_A$, $24_B$, $24_C$. (i.e., the number of sentences in the set) is below some desirable number.

The processor 16 is also capable of receiving human evaluation data from one or more human evaluators using the input device 22. The human evaluator(s) retrieve or are provided with the original document (or a copy thereof) and the set of sentences (e.g., the list of all of the sentences ranked by the summarization engines $24_A$, $24_B$, $24_C$). The human evaluator may retrieve the document and set of sentences from the local computing system 12. The human evaluator may also be provided with the document and the set of sentences. Taking into account the document itself (i.e., after reviewing the document), each human evaluator ranks each sentence in the set of sentences in order of most salient to least salient. In an example, the most salient sentence may receive the highest score (e.g., 15 out of 15), and the least salient sentence may receive the lowest score (e.g., 1 out of 15). Any other ranking or scoring system may be used as long as each of the sentences is assigned a value that indicates its ranking. Using the above example, each human evaluator is provided with the set of 15 sentences, and ranks the 15 sentences in order of which sentence he/she deems is the most significant (rating it a 15) to the least significant (rating it a 1).

By ranking only those sentences within the set of sentences, the human evaluators are not ranking sentences that have been deemed functionally irrelevant by the summarization engines $24_A$, $24_B$, $24_C$. In other words, the human evaluators are not ranking sentences that were not ranked by any one of the summarization engines $24_A$, $24_B$, $24_C$.

The human evaluation data i.e., (the human rank of each sentence in the set) is then input into the local computing system 12, using the input device 22, and is received by the processor 16. The processor 16 executes computer readable instructions 18 to assign a relative human rank to each of the sentences in the set based upon the human evaluation data (i.e., the human rankings). The relative human rank may be a weight that is assigned to each sentence evaluated by the human evaluators, where the assigned relative human rank/weight depends upon the rank of each individual sentence when all of the received human evaluation data is taken into account. For example, if the processor 16 receives human evaluation data from one human evaluator, the relative human rank/weight may match the human ranking. As an example, the sentences ranked 15 (most salient) through 1 (least salient) by a single human evaluator may be assigned relative human ranks/weights, respectively, of 15.0 (most salient) through 1.0 (least salient).

If however, the processor 16 receives human evaluation data from more than one human evaluator, the relative human rank/weight will be based upon all of the human rankings that are received. For example, if the processor 16 receives human evaluation data from five human evaluators, the human rankings for each sentence will be averaged and the sentences will be re-ranked based upon the averages. The data from different human evaluators could be weighted differently, for example, if one set of human evaluation data were from an expert in a particular subject matter, this data could be weighted higher than the other sets of human evaluation data. In this instance, the re-ranking will take into account the different weights. The relative human rank/weight will then be assigned to the re-ranked sentences. The following example involves a three sentence set from an email that was evaluated by the summarization engines $24_A$, $24_B$, and $24_C$ and a human ranking scheme of 3=most salient, 2=less salient, and 1=least salient. In this example, sentence number 1 is given, by the respective human evaluators, four scores of 3 and one score of 2 (average score=2.8), sentence number 2 is given, by the respective human evaluators, two scores of 2 and three scores of 1 (average score=1.4), and sentence number 3 is given, by the respective human evaluators, two scores of 1 and three scores of 2 (average score=1.6). When re-ranked based upon the average scores, the order of the sentences will be sentence number 1 with the highest average score, followed by sentence 3, and then sentence 2 with the lowest average.

In this example, sentence number 1 may be assigned a relative human rank of 3.0, sentence number 3 may be assigned a relative human rank of 2.0, and sentence number 2 may be assigned a relative human rank of 1.0. As such, the relative human rank/weight assigned by the processor 16 may or may not be the same as any individual human ranking that is initially received at the processor 16 by the respective human evaluators.

The relative human rank/weight may correspond with the number of sentences in any given set. For example, if the set contains X number of sentence the relative human rank/weight may range from X.0 down to 1.0, where X.0 is assigned to the sentence with the highest human rank or average human rank and 1.0 is assigned to the sentence with the lowest human rank or average human rank. In another example, the human evaluator may be given a set number of points (e.g., 100 points), and asked to assign the points in any manner to the sentences in the given set. Some evaluators may distribute the points relatively evenly, while other evaluators may divide all the points among a few sentences within the set. Table 4 below illustrates an example of the relative human rank/weight assigned by the processor 16 after averaging received human evaluation data for the example given herein with the set of 15 sentences that includes sentence numbers 1, 3, 4, 5, 6, 7, 9, 14, 19, 24, 25, 29, 30, 33, and 35 (originally selected and ranked by the summarization engines $24_A$, $24_B$, $24_C$),

TABLE 4

| Sentence Number | Relative Human Rank/Weight |
|---|---|
| 1 | 15.0 |
| 7 | 14.0 |
| 3 | 13.0 |
| 14 | 12.0 |
| 4 | 11.0 |
| 6 | 10.0 |
| 9 | 9.0 |
| 19 | 8.0 |
| 33 | 7.0 |
| 35 | 6.0 |
| 5 | 5.0 |
| 25 | 4.0 |
| 29 | 3.0 |
| 24 | 2.0 |
| 30 | 1.0 |

The processor 16, running computer readable instructions 18, is capable of determining a combined weight for each of the summarization engines $24_A$, $24_B$, $24_C$. In determining the combined weight, the processor 16 uses the weight assigned to a particular sentence from a particular summarization engine $24_A$, $24_B$, $24_C$ and uses the relative human rank assigned to the particular sentence. More particularly, the combined weight is equal to the weight of each individual sentence selected by the particular summarization engine $24_A$, $24_B$, $24_C$ multiplied by the relative human rank assigned to that sentence. The weight of each individual sentence may also be referred to as the weight that is associated with a particular rank (e.g., ranks 1 through 10 in the output summaries in Tables 1-3) assigned by the summarization engines $24_A$, $24_B$, $24_C$. In an example then, the combined weight (CW) for any individual sentence (S) selected by any individual summarization engine $24_A$, $24_B$, $24_C$ may be determined by the following equation:

$$CW(S) = W(i) \times RHR(S(i,j)) \quad \text{(Equation 1)}$$

where W(i) is the weight associated with the particular rank that the sentence (S) is assigned by the summarization engine (j), and RHR(S(i,j)) is the relative human rank of the sentence (S) identified by the rank and the summarization engine, or (i,j).

(j)=1 ... y, where Y is the total number of summarization engines $24_A$, $24_B$, $24_C$. In this example, the total number of summarization engines is 3, where engine $24_A$ is the first engine, $24_B$ is the second engine, and $24_C$ is the third engine. The sentence (S) may be identified using the data in any of the output summaries. As examples, S(5, 3) is the sentence ranked 5th by summarization engine $24_C$, or sentence number 7 in Table 3, and S(8, 1) is the sentence ranked 8th by summarization engine $24_A$, or sentence number 33 in Table 1. Using Tables 1 and 4 above, the combined weight for sentence 4 selected by the summarization engine $24_A$ is 10.0 (the weight assigned to rank 1 multiplied by 11.0 (the relative human rank assigned to sentence 4), or 110.0.

The total weight for each summarization engine $24_A$, $24_B$, $24_C$ may be determined by adding together all of the combined weights for the sentences selected by a particular summarization engine $24_A$, $24_B$, $24_C$. As such, the total weight (TW) for any summarization engine (j) may be determined by the following equation:

$$TW_j = \sum_{i=1}^{N_S} W(i) \times RHR(S(i,j)) \quad \text{(Equation 2)}$$

where $N_S$ is the number of sentences. W(i) and RHR(S(i,j)) are described above in reference to equation 1.

Table 5 below illustrates the combined weights of the individual sentences selected by each of the summarization engines $24_A$, $24_B$, $24_C$, and also the total weight for each of the summarization engines $24_A$, $24_B$, $24_C$. The ranks, sentence number associated with each of the ranks, and weight associated with each of the ranks correspond with the output summary for each of the summarization engines $24_A$, $24_B$, $24_C$.

TABLE 5

| Rank of the Sentence (Weight) | Summarization Engine $24_A$ | | Summarization Engine $24_B$ | | Summarization Engine $24_C$ | |
|---|---|---|---|---|---|---|
| | Sentence Number | Combined Weight | Sentence Number | Combined Weight | Sentence Number | Combined Weight |
| 1 (10.0) | 4 | 110.0 | 7 | 140.0 | 1 | 150.0 |
| 2 (9.0) | 7 | 126.0 | 1 | 135.0 | 14 | 108.0 |
| 3 (8.0) | 3 | 104.0 | 6 | 80.0 | 4 | 88.0 |
| 4 (7.0) | 14 | 84.0 | 29 | 21.0 | 3 | 91.0 |
| 5 (6.0) | 25 | 24.0 | 19 | 48.0 | 7 | 84.0 |
| 6 (5.0) | 9 | 45.0 | 4 | 55.0 | 19 | 40.0 |
| 7 (4.0) | 1 | 60.0 | 5 | 20.0 | 25 | 16.0 |
| 8 (3.0) | 33 | 21.0 | 3 | 39.0 | 30 | 3.0 |

TABLE 5-continued

| Rank of the | Summarization Engine $24_A$ | | Summarization Engine $24_B$ | | Summarization Engine $24_C$ | |
|---|---|---|---|---|---|---|
| Sentence (Weight) | Sentence Number | Combined Weight | Sentence Number | Combined Weight | Sentence Number | Combined Weight |
| 9 (2.0) | 19 | 16.0 | 33 | 14.0 | 9 | 18.0 |
| 10 (1.0) | 35 | 6.0 | 14 | 12.0 | 24 | 2.0 |
| Total Weight | | 596.0 | | 564.0 | | 600.0 |

The total weights for the summarization engines $24_A$, $24_B$, $24_C$ may be compared to one another to determine which summarization engine $24_A$, $24_B$, $24_C$ has the highest overall weight and thus is the best summarization engine $24_A$, $24_B$, $24_C$, for the document. The processor 19 running computer readable instructions 18 may perform this comparison and provide the result on a display screen of the local computing system 12, as a printout, or in any other suitable manner. A user may also manually perform the comparison when he/she is provided with the total weights from the local computing system 12. The results in Table 5 indicate that for the document, summarization engine $24_C$ is the best of the engines $24_A$, $24_B$, $24_C$ with an overall weight of 600, but that summarization engine $24_A$ is not much different with an overall weight of 596. These results may contribute to a determination as to which summarization engine $24_A$, $24_B$, $24_C$ to use in the future. For example, if summarization engine $24_A$ were cheaper than summarization engine $24_C$, one may selected summarization engine $24_A$ since its performance was similar to summarization engine $24_C$.

The combinatorial summarization method previously described herein provides relative, quantitative and comparative data. For larger sample sets of the summarization engines, the relative differences in total weights may indicate that some summarization engines are more or less interchangeable with one another in quality and value, and may also indicate that other summarization engine(s) should not be used in place of the summarization engine(s) having the highest total weight.

The previously described method provides a complete ranking of all of the sentences in the set of sentences selected by the various summarization engines $24_A$, $24_B$, $24_C$. Different combinations of two or more summarization engines may be evaluated using meta-algorithmic patterns, such as a voting pattern or a weighted voting pattern. Another suitable meta-algorithmic pattern that may be used includes constrained substitution, in which a suitable engine $24_A$, $24_B$, $24_C$ is selected for a given bandwidth, processing time, cost, or other system constraint. These patterns may be applied to the sentences within the set to further evaluate the summarization engines $24_A$, $24_B$, $24_C$, or more particularly any combinations of the engines $24_A$, $24_B$, $24_C$, that originally select, rank, and weight the sentences.

The voting pattern may be applied by the processor 16 running computer readable instructions 18. When the voting pattern is applied, the weights assigned to a sentence by the individual summarization engines $24_A$, $24_B$, $24_C$ are added together to generate a sum of weights for that sentence. The sum of weights for any given sentence is the overall weight given by the combination of the summarization engines $24_A$, $24_B$, $24_C$. A respective sum is generated for each of the sentences in the set of sentences for the summarization engines $24_A$, $24_B$, $24_C$ being evaluated. For example, if it were desirable to further evaluate summarization engines $24_A$ and $24_C$, the sum of weights could be calculated for the set of sentences selected by those two engines alone. In other words, the voting pattern may be applied on any number of the engines $24_A$, $24_B$, $24_C$ ranging from two of the engines to all of the engines. It may be undesirable to exclude certain engines for any number of reasons, including cost, licensing, performance, accuracy, etc. Table 6 illustrates the sums that are generated at this step of the voting pattern for the sentences in the set selected by summarization engines $24_A$, $24_B$, $24_C$. When a sentence in the set has not been assigned a rank and an associated weight by one or more of the summarization engines $24_A$, $24_B$, $24_C$, the weight is N/A or zero.

TABLE 6

| Sentence Number | Sentence Weight given by Summarization Engine $24_A$ | Sentence Weight given by Summarization Engine $24_B$ | Sentence Weight given by Summarization Engine $24_C$ | Sum of Weights |
|---|---|---|---|---|
| 1 | 4.0 | 9.0 | 10.0 | 23.0 |
| 3 | 8.0 | 3.0 | 7.0 | 18.0 |
| 4 | 10.0 | 5.0 | 8.0 | 23.0 |
| 5 | N/A | 4.0 | N/A | 4.0 |
| 6 | N/A | 8.0 | N/A | 8.0 |
| 7 | 9.0 | 10.0 | 6.0 | 25.0 |
| 9 | 5.0 | N/A | 2.0 | 7.0 |
| 14 | 7.0 | 1.0 | 9.0 | 17.0 |
| 19 | 2.0 | 6.0 | 5.0 | 13.0 |
| 24 | N/A | N/A | 1.0 | 1.0 |
| 25 | 6.0 | N/A | 4.0 | 10.0 |
| 29 | N/A | 7.0 | N/A | 7.0 |
| 30 | N/A | N/A | 3.0 | 3.0 |
| 33 | 3.0 | 2.0 | N/A | 5.0 |
| 35 | 1.0 | N/A | N/A | 1.0 |

At least some of the sentences are then re-ranked by the processor 16 running computer readable instructions 18 based upon the sum of weights. In an example, a predetermined number of the sentences are re-ranked, and the predetermined number forms a discrete subset of sentences. The discrete subset of sentences may include the same number of sentences that each summarization engine $24_A$, $24_B$, $24_C$ originally selected. For example, if each summarization engine $24_A$, $24_B$, $24_C$ originally selected 10 sentences, then the discrete subset of sentences that are re-ranked based upon the sum of weights may include 10 sentences. In another example, the processor 16 may re-rank all of the sentences in the set (which includes all of the sentences selected by the various summarization engines $24_A$, $24_B$, $24_C$), and thus the discrete subset may include more sentences than any one summarization engine individually selected $24_A$, $24_B$, $24_C$.

When the sentences are re-ranked, the sentences are also assigned a new weight based upon the re-ranking. The new weight is representative of the weight assigned by the combination of the summarization engines $24_A$, $24_B$, $24_C$. Any of the previously described ranking and weighting schemes may be used to re-rank and re-weight the sentences. For example, the sentence with the highest sum of weights may be ranked first (i.e., the most salient sentence) and assigned the highest new weight of the re-ranked sentences. When two of the sentences have the same sum, the processor 18 may be configured to review the relative human ranking to determine which of the sentences should be ranked and weighted higher among the re-ranked sentences. For example, the sentence with the highest overall ranking by the human evaluators may be selected. Any other tie-breaking scheme may be used to rank the sentences having the same sum.

After re-ranking the sentences based upon the respective sums and assigning the new weights to the re-ranked sentences, the processor 16 running computer readable instructions 18 is capable of determining a total weight of the combination of the summarization engines $24_A$, $24_B$, $24_C$. The total weight of the combination is based upon the new weights and the previously assigned relative human ranks of each sentence in the discrete subset (i.e., the re-ranked sentences). To determine the total weight of the combination of the summarization engines $24_A$, $24_B$, $24_C$, the processor 16, running computer readable instructions 18, may first determine a new combined weight for each of the re-ranked sentences. In determining the new combined weight, the processor 16 multiplies the new weight assigned to a particular sentence by the reveive human rank previously assigned to the particular sentence. In an example then, the new combined weight (NCW) for any individual sentence (S) that has been re-ranked according to the sum of weights may be determined by the following equation:

$$\text{NCW}(S) = (i) \times \text{RHR}(i) \quad \text{(Equation 3)}$$

where NW(i) is the new weight associated with the particular rank (i) that the re-ranked sentence is assigned, and RHR(i) is the relative human rank previously assigned to the sentence.

The total weight for the combination of summarization engines $24_A$, $24_B$, $24_C$ may be determined by adding together ell of the new combined weights for the re-ranked sentences. As such, the total weight for the combination of summarization engines $24_A$, $24_B$, $24_C$ (i.e., $\text{TW}_{combo}$) may be determined from the following equation:

$$\text{TW}_{combo} = \Sigma_{i=1}^{NSNW}(i) \times \text{RHR}(i) \quad \text{(Equation 4)}$$

where $N_S$ is the number of sentences. NW(i) and RHR(i) are described above in reference to equation 3.

Table 7 below illustrates the top 10 re-ranked sentences based upon the sum of weights results shown in Table 6. Table 7 also illustrates the new combined weights of the individual re-ranked sentences, and also the total weight for the combination of the summarization engines $24_A$, $24_B$, $24_C$.

TABLE 7

| New Rank | New Weight | Sentence Number (sum of weights from Table 6) | (New Weight) × (Relative Human Ranking) = New Combined Weight |
|---|---|---|---|
| 1 | 10.0 | 7 (25.0) | 10.0 × 14.0 = 140.0 |
| 2 | 9.0 | 1 (23.0) | 9.0 × 15.0 = 135.0 |
| 3 | 8.0 | 4 (23.0) | 8.0 × 11.0 = 88.0 |
| 4 | 7.0 | 3 (18.0) | 7.0 × 13.0 = 91.0 |
| 5 | 6.0 | 14 (17.0) | 6.0 × 12.0 = 72.0 |
| 6 | 5.0 | 19 (13.0) | 5.0 × 8.0 = 40.0 |
| 7 | 4.0 | 25 (10.0) | 4.0 × 4.0 = 16.0 |
| 8 | 3.0 | 6 (8.0) | 3.0 × 10.0 = 30.0 |
| 9 | 2.0 | 29 (7.0) | 2.0 × 3.0 = 6.0 |
| 10 | 1.0 | 9 (7.0) | 1.0 × 9.0 = 9.0 |
| Total Weight for the Combination | | | 627.0 |

The maximum total weight ($\text{TW}_{max}$) for the combination of summarization engines $24_A$, $24_B$, $24_C$ may also be determined using Equation 4. It is to be understood that the maximum total weight for the combination of summarization engines $24_A$, $24_B$, $24_C$ is obtained if the re-ranked order for the combination of summarization engines $24_A$, $24_B$, $24_C$ were the same as the rankings of the human evaluators. For example, when the order of the sentences in the re-ranked order corresponded exactly with the order of the sentences according to the relative human ranks/weights, the maximum total weight is obtained. In this instance, the highest new weight would be multiplied by the highest relative human rank/weight to give the highest new combined weight, the second highest new weight would be multiplied by the second highest relative human rank/weight to give the second highest new combined weight, and so on. All of these new combined weights are added together by the processor 16 running computer readable code 18 in order to calculate the maximum total weight for any combination of summarize engines $24_A$, $24_B$, $24_C$.

For the example provided herein, the maximum total weight for the combination of summarization engines $24_A$, $24_B$, $24_C$ is 660.0. The total weight for the combination of summarization engines $24_A$, $24_B$, $24_C$ determined when the voting pattern is applied and the total weight for each individual summarization engine $24_A$, $24_B$, $24_C$ may be compared to the maximum total weight for the combination in order to evaluate the overall performance of the individual engines $24_A$, $24_B$, $24_C$, and the combination of the engines $24_A$, $24_B$, $24_C$. For example, the total weight for the combination of the summarization engines $24_A$, $24_B$, $24_C$ (i.e., 627.0 shown in Table) is much closer to the maximum total weight of 660.0 than the total weight for any of the individual summarization engines $24_A$, $24_B$, $24_C$, which had individual total weights of 596.0, 564.0, and 600.0, respectively. In this example, the combination of the engines $24_A$, $24_B$, $24_C$ when applying the voting pattern) is a much improved summarization engine because it is 46% closer to the maximum total weight than the best individual summarization engine $24_C$.

In another example, a weighted voting pattern may be applied by the processor 16 running computer readable instructions 18. When the weighted voting pattern is applied, a weighted combination of the summarization engines $24_A$, $24_B$, $24_C$ is utilized to re-rank the sentences.

At the outset, a weight for each of the summarization engines $24_A$, $24_B$, $24_C$ may be calculated. In an example, the weight of each summarization engine $24_A$, $24_B$, $24_C$ may be proportionate to the inverse of the error, of that summarization engine $24_A$, $24_B$, $24_C$, where the error is equal to the maximum total weight for the combination minus the total weight for the individual summarization engine (i.e., $e_j = TW_{max} - TW_j$). In this example, the weight ($W_j$) of each summarization engine $24_A$, $24_B$, $24_C$ may be determined by the following equation:

$$W_j = \frac{1/e_j}{\sum_{j=1}^{N_{Summ}} 1/e_j} \quad \text{[Equation 5]}$$

where $N_{Summ}$ is the number of summarization engines. The calculation of the weight of each summarization engine $24_A$, $24_B$, $24_C$ using equation 5 is shown in Table 8.

TABLE 8

| Summarization Engine | Error, $e_j$ | Weight, $W_j$ |
|---|---|---|
| $24_A$ | 660.0 − 596.0 = 64 | $\frac{1/64}{((1/64)+(1/96)+(1/60))} = 0.366$ |
| $24_B$ | 660.0 − 564.0 = 96 | $\frac{1/96}{((1/64)+(1/96)+(1/60))} = 0.244$ |
| $24_C$ | 660.0 − 600.0 = 60 | $\frac{1/60}{((1/64)+(1/96)+(1/60))} = 0.390$ |

In the example disclosed herein, the weight of each summarization engine $24_A$, $24_S$, $24_C$ is based upon one set of training data (i.e., data obtained for the document after one summarization and one human evaluation is performed). In other instances, however, it may be more desirable to obtain multiple sets of training data so that the error is based upon more than one set of training data. For example, multiple documents may be summarized and evaluated, and all of the data may be used to obtain an average total weight for the individual summarization engine, which in turn may be used to calculate the error.

In another example, the weight of the summarization engine $24_A$, $24_B$, $24_C$ may be calculated using a confidence value of that particular engine.

When the weighted voting pattern is applied, a weighted sum may be calculated for each sentence based on the respective weights of the summarization engines $24_A$, $24_B$, $24_C$ and the weight originally assigned to each sentence from each of the respective summarization engines $24_A$, $24_B$, $24_C$.

A respective weighted sum is generated for each of the sentences in the set of sentences for the summarization engines $24_A$, $24_B$, $24_C$ being evaluated. For example, if it were desirable to further evaluate summarization engines $24_A$ and $24_C$, the weighted sum could be calculated for the set of sentences selected by those two engines alone. As such, the weighted voting pattern may be applied to all of the engines, or any combination of the engines. The weight sum may be calculated using the following equation:

$$\text{Weighted Sum} = \sum_{j=1}^{N_{Summ}} W_j \times W_i \quad \text{(Equation 6)}$$

were $N_{Summ}$ is the number of summarization engines, is weight of each summarization engine $24_A$, $24_B$, $24_C$, and $W_i$ is the weight associated with the particular rank (i) that the sentence (S) is assigned by the summarization engine (j). Table 9 illustrates the weighted sums that are generated at this step of the weighted voting pattern for the sentences in the set selected by summarization engines $24_A$, $24_B$, $24_C$. When a sentence in the set has not been assigned a rank and an associated weight by one or more of the summarization engines $24_A$, $24_B$, $24_C$, $W_j \times W_i$ is N/A or zero.

TABLE 9

| Sentence Number | Summarization Engine $24_A$ $W_j \times W(i)$ | Summarization Engine $24_B$ $W_j \times W(i)$ | Summarization Engine $24_C$ $W_j \times W(i)$ | Weighted Sum |
|---|---|---|---|---|
| 1 | 0.366 × 4.0 = 1.464 | 0.244 × 9.0 = 2.196 | 0.390 × 10.0 = 3.9 | 7.560 |
| 3 | 0.366 × 8.0 = 2.928 | 0.244 × 3.0 = 0.732 | 0.390 × 7.0 = 2.73 | 6.390 |
| 4 | 0.366 × 10.0 = 3.66 | 0.244 × 5.0 = 1.22 | 0.390 × 8.0 = 3.12 | 8.000 |
| 5 | N/A | 0.244 × 4.0 = 0.976 | N/A | 0.976 |
| 6 | N/A | 0.244 × 8.0 = 1.952 | N/A | 1.952 |
| 7 | 0.366 × 9.0 = 3.294 | 0.244 × 10.0 = 2.44 | 0.390 × 6.0 = 2.34 | 8.074 |
| 9 | 0.366 × 5.0 = 1.83 | N/A | 0.390 × 2.0 = 0.78 | 2.610 |
| 14 | 0.366 × 7.0 = 2.562 | 0.244 × 1.0 = 0.244 | 0.390 × 9.0 = 3.51 | 6.316 |
| 19 | 0.366 × 2.0 = 0.732 | 0.244 × 6.0 = 1.464 | 0.390 × 5.0 = 1.95 | 4.146 |
| 24 | N/A | N/A | 0.390 × 1.0 = 0.390 | 0.390 |
| 25 | 0.366 × 6.0 = 2.196 | N/A | 0.390 × 4.0 = 1.56 | 3.756 |
| 29 | N/A | 0.244 × 7.0 = 1.708 | N/A | 1.708 |
| 30 | N/A | N/A | 0.390 × 3.0 = 1.17 | 1.17 |
| 33 | 0.366 × 3.0 = 1.098 | 0.244 × 2.0 = 0.488 | N/A | 1.586 |
| 35 | 0.366 × 1.0 = 0.366 | N/A | N/A | 0.366 |

At least some of the sentences are then re-ranked by the processor 16 running computer readable instructions 18 based upon the weighted sums. In an example, a predetermined number of the sentences are re-ranked, and the predetermined number forms a discrete subset of sentences. The discrete subset of sentences may include the same number of sentences that each summarization engine $24_A$, $24_B$, $24_C$ originally selected. For example, if each summarization engine $24_A$, $24_B$, $24_C$ originally selected 10 sentences, then the discrete subset of sentences that are re-ranked based upon the weighted sums may include 10 sentences. In another example, the processor 16 may re-rank all of the sentences in the set (which includes all of the sentences selected by the various summarization engines $24_A$, $24_B$, $24_C$), and thus the discrete subset may include more sentences than any one summarization engine individually selected $24_A$, $24_B$, $24_C$.

When the sentences are re-ranked, the sentences are also assigned a new weight based upon the re-ranking. Any of the previously described ranking and weighting schemes may be used to re-rank and re-weight the sentences. For example, the sentence with the highest weighted sum may be ranked first (i.e., the most salient sentence) and assigned the highest new weight of the re-ranked sentences. When two of the sentences have the same weighted sum, the processor 16 may be configured to review the relative human ranking to determined which of the sentences should be ranked and weighted higher among the re-ranked sentences. For example, the sentence with the highest ranking among the relative human ranks may be selected. Other tie-breaking schemes may also be used.

After re-ranking the sentences based upon the respective weighted sums and assigning the new weights to the re-ranked sentences, the processor 16 running computer readable instructions 18 is capable of determining a total weight of the combination of the summarization engines $24_A$, $24_B$, $24_C$. The total weight of the combination is based upon the new weights and the previously assigned relative human ranks of each sentence in the discrete subset (i.e., the re-ranked sentences). To determine the total weight of the combination of the summarization engines $24_A$, $24_B$, $24_C$, the processor 16, running computer readable instructions 18, may first determine a new combined weight for each of the re-ranked sentences. In determining the new combined weight, the processor 16 multiplies the new weight assigned to a particular sentence by the relative human rank previously assigned to the particular sentence. The new combined weight when the weighted voting pattern is applied may be determined using Equation except that NW(i) is the new weight associated with the particular rank (i) that the sentence is assigned when re-ranked based upon the weighted sums.

The total weight for the combination of summarization engines $24_A$, $24_B$, $24_C$ may be determined by adding together all of the new combined weights for the sentences re-ranked based upon the weighted sums.

Table 10 below illustrates the top 10 re-ranked sentences based upon the sums shown in Table 9. Table 10 also illustrates the new combined weights of the individual re-ranked sentences, and also the total weight for the combination of the summarization engines $24_A$, $24_B$, $24_C$.

TABLE 10

| New Rank | New Weight | Sentence Number (weighted sums from Table 9) | (New Weight) × (Relative Human Ranking) = New Combined Weight |
|---|---|---|---|
| 1 | 10.0 | 7 (8.074) | 10.0 × 14.0 = 140.0 |
| 2 | 9.0 | 4 (8.000) | 9.0 × 11.0 = 99.0 |
| 3 | 8.0 | 1 (7.560) | 8.0 × 15.0 = 120.0 |
| 4 | 7.0 | 3 (6.390) | 7.0 × 13.0 = 91.0 |
| 5 | 6.0 | 14 (6.316) | 6.0 × 12.0 = 72.0 |
| 6 | 5.0 | 19 (4.146) | 5.0 × 8.0 = 40.0 |
| 7 | 4.0 | 25 (3.756) | 4.0 × 4.0 = 16.0 |
| 8 | 3.0 | 9 (2.610) | 3.0 × 9.0 = 27.0 |
| 9 | 2.0 | 6 (1.952) | 2.0 × 10.0 = 20.0 |
| 10 | 1.0 | 29 (1.708) | 1.0 × 3.0 = 3.0 |
| Total Weight | | | 628.0 |

The total weight for the combination of summarization engines $24_A$, $24_B$, $24_C$ determined when the weighted voting pattern is applied and the total weight for each individual summarization engine $24_A$, $24_B$, $24_C$ may be compared to the maximum total weight for the combination in order to evaluate the overall performance of the individual engines $24_A$, $24_B$, $24_C$ and the combination of the engines $24_A$, $24_B$, $24_C$. For example, the total weight for the weighted combination of the summarization engines $24_A$, $24_B$, $24_C$ (i.e., 628.0 shown in Table 10) is much closer to the maximum total weight of 660.0 than the total weight for any of the individual summarization engines $24_A$, $24_B$, $24_C$, which had individual total weights of 596.0, 564.0, and 600.0, respectively. In this example, the combination of the engines $24_A$, $24_B$, $24_C$ (when applying the weighted voting pattern) is a much improved summarization engine because it is 461% closer to the maximum total weight than the best individual summarization engine $24_C$.

Referring now to FIG. 2, the combinatorial summarizer 10' is implemented in the cloud computing system 14. The cloud computing system or "cloud" is a computer network accessible over the Internet that is dynamically scalable with virtualized resources, distributed systems, shared resources, local area networks (LAN), or an Intranet in the case of a private cloud. In an example, the cloud 14 may or may not be physically distributed. The user of the combinatorial summarizer 10' not required to have knowledge or expertise in the infrastructure of the cloud 14 that relies on the Internet to satisfy his/her summarization and evaluation needs. The cloud 14 provides the services of the combinatorial summarizer 10' that are accessible from a we browser, while computer readable instructions 18 and data may be stored on servers (which include media 20 and memory) in the cloud 14.

The cloud computing system 14 may be a private cloud, a public cloud or a hybrid cloud. Further, the cloud 14 may be a combination cloud computing system including a private cloud for multiple private clouds) and a public cloud (or multiple public clouds).

The cloud computing system 14 may include multiple pieces of hardware operatively coupled over the network so that they can perform a specific computing task (e.g., the combinatorial summarization methods disclosed herein). The cloud 14 may include a combination of physical hardware 30, software 32, and virtual hardware 34.

The physical hardware 30 may include, among others, processors, memory devices, and networking equipment. The virtual hardware 34 is a type of software that is processed by the physical hardware 30 and designed to emulate specific hardware. As an example, virtual hardware 34 may include a virtual machine (VM), i.e., a software implementation of a computer that supports execution of an application like a physical machine.

An application, as used herein, refers to a set of specific instructions executable by a computing system for facilitating carrying out a specific task. For example, an application may take the form of a web-based tool providing users with a specific functionality, e.g., document summarization and/ or evaluation. Software 32 is a set of instructions and data configured to cause virtual hardware 34 to execute the application. The cloud computing system 14 can thus render a particular application available to users associated with the computing system to.

Executing the application in the cloud 14 may involve receiving a number of requests, processing the requests according to the particular functionality implemented by the application, and returning request responses to the requesting computing system 26. For executing the application, the resources (e.g., physical hardware 30, virtual hardware 34, and software 32) of the cloud computing system 14 may be scaled depending on the demands posed on the application. For example, cloud 14 may vary the size of the resources allocated to the application depending on the number of requests, the number of users interacting with the application, or requirement on the performance of the application (e.g., a maximum response time). While not shown, it is to be understood that the cloud 14 may also include an interface that allows the computing system 26 to communicate with the components of the cloud 14.

Referring still to FIG. 2, the physical hardware 30 of the cloud 4 may include the processor 16 and the medium 20. The processor 16 may be any processor that is capable of executing program instructions 18 stored in the media 20 to implement, for example, the combinatorial summarization methods as disclosed herein. The media 20 may include an operating system and applications, such as a combinatorial summarization application. The operating system may be a collection of programs that, when executed by the processor 16, serves as a platform on which the combinatorial summarization application can run. Some examples of operating systems include various versions of Linux® and Microsoft Windows®.

As illustrated in FIG. 2, the computing system 26 may be connected to the cloud computing system 14 via a link 28. It is to be understood that the computing system 26 may include one or more standalone computing systems and/or a network of computing systems. The links 28 may be one or more of cable, wireless, fiber optic, or remote connections via a telecommunication link, an infrared link, a radio frequency link, or any other connectors or systems that provide electronic communication. Links 28 may include, at least in part, an intranet, the Internet, or a combination of both. The links 28 may also include intermediate proxies, routers, switches, load balancers, and the like.

The methods disclosed herein advantageously utilize human feedbag in additional to weighting schemes to quantitatively evaluate the summarization engines $24_A$, $24_B$, $24_C$ alone or in combination with one another. Utilizing data from a pool of summarization engines $24_A$, $24_B$, $24_C$ results in improved summarization.

While several examples have been described in detail, it will be apparent to those skilled in the art that the disclosed examples may be modified. Therefore, the foregoing description is to be considered non-limiting.

What is claimed is:

1. A combinatorial summarizer, comprising:
   a plurality of summarization engines, each of which is a set of different computer readable instructions to:
      select a respective plurality of sentences from a document; and
      generate a relative rank and an associated weight for each sentence of the respective plurality of sentences;
   a processor in selective communication with each of the plurality of summarization engines; and
   computer readable instructions executable by the processor and embodied on a tangible, non-transitory computer readable medium, the computer readable instructions including:
      computer readable instructions to determine a combined weight for each sentence of each of the respective plurality of sentences, the combined weight being based upon the respective associated weight and a respective relative human rank for each sentence in a set of sentences including all of the sentences of each of the respective plurality of sentences; and
      computer readable instructions to determine a total weight for each of the plurality of summarization engines based, respectively, upon the combined weights for each sentence of each of the respective plurality of sentences.

2. The combinatorial summarizer as defined in claim 1 wherein the computer readable instructions further include computer readable instructions to apply a meta-algorithmic pattern to each sentence of each of the respective plurality of sentences.

3. The combinatorial summarizer as defined in claim 2 wherein the meta-algorithmic pattern is a voting pattern, and wherein the computer readable instructions to apply the voting pattern include:
   computer readable instructions to determine a sum of the associated weights for each sentence of each of the respective plurality of sentences;
   computer readable instructions to rank a predetermined number of a discrete subset of sentences of each of the respective plurality of sentences according to the sum of the associated weights;
   computer readable instructions to assign a new weight to the sentences of the discrete subset; and
   computer readable instructions to determine a total weight for a combination of the plurality of summarization engines based upon the new weight and the relative human rank for the sentences of the discrete subset.

4. The combinatorial summarizer as defined in claim 2 wherein the meta-algorithmic pattern is a weighted voting pattern, and wherein the computer readable instructions to apply the weighted voting pattern include:
   computer readable instructions to determine a weight for each of the plurality of summarization engines;
   computer readable instructions to determine a weighted sum for each sentence of each of the respective plurality of sentences, the weighted sum being based on the weights for each of the plurality of summarization engines and the associated weights for each sentence of each of the respective plurality of sentences;
   computer readable instructions to rank a predetermined number of a discrete subset of sentences of each of the respective plurality of sentences according to the weighted sum;
   computer readable instructions to assign a new weight to the sentences of the discrete subset; and
   computer readable instructions to determine a total weight for a combination of the plurality of summarization engines based upon the new weight and the relative human rank for the sentences of the discrete subset.

5. The combinatorial summarizer as defined in claim 1, further comprising:
   an input device in selective communication with the processor, the input device to receive a human ranking for each sentence in the set of sentences; and
   computer readable instructions for assigning the relative human rank to each sentence in the set of sentences based upon the human ranking.

6. The combinatorial summarizer as defined in claim 1 wherein the summarizer is part of a cloud computing system.

7. The combinatorial summarizer as defined in claim 1 wherein the computer readable instructions further include computer readable instructions to generate the set of sentences.

8. The combinatorial summarizer of claim 1, wherein the relative rank from each of the plurality of summarization engines are different quantitative ranks and the human rank is a qualitative rank, and the rankings are from the most salient sentence to the least salient sentence, and wherein the human rank does not include ranking sentences of the document that were not ranked by any one of the summarization engines.

9. A combinatorial summarization method, comprising:
receiving, from each of a plurality of summarization engines, each of which is a set of different computer readable instructions and by a processor running computer readable instructions embodied on a tangible, non-transitory computer readable medium, a relative rank and an associated weight for each sentence of a respective plurality of sentences selected by each of the plurality of summarization engines from a document;
receiving, by the processor, a relative human rank for each sentence in a set of sentences including all of the sentences of each of the respective plurality of sentences;
determining, by the processor, a combined weight for each sentence of each of the respective plurality of sentences, the combined weight being based upon the respective associated weight and the respective relative human rank; and
determining, by the processor, a total weight for each of the plurality of summarization engines based, respectively, upon the combined weights for each sentence of each of the respective plurality of sentences.

10. The combinatorial summarization method as defined in claim 9, further comprising evaluating the plurality of summarization engines based upon the total weights.

11. The combinatorial summarization method as defined in claim 9, further comprising applying, by the processor, a meta-algorithmic pattern to each sentence of each of the respective plurality of sentences.

12. The combinatorial summarization method as defined in claim 11, wherein the meta-algorithmic pattern is a voting pattern, and wherein applying the voting pattern includes:
determining, by the processor, a sum of the associated weights for each sentence of each of the respective plurality of sentences;
ranking, by the processor, a predetermined number of a discrete subset of sentences of each of the respective plurality of sentences according to the sum of the associated weights;
assigning, by the processor, a new weight to the sentences of the discrete subset; and
determining, by the processor, a total weight for a combination of the plurality of summarization engines based upon the new weight and the relative human rank for the sentences of the discrete subset.

13. The combinatorial summarization method as defined in claim 11, wherein the meta-algorithmic pattern is a weighted voting pattern, and wherein applying the weighted voting pattern includes:
determining, by the processor, a weight for each of the plurality of summarization engines;
determining, by the processor, a weighted sum for each sentence of each of the respective plurality of sentences, the weighted sum being based on the weights for each of the plurality of summarization engines and the associated weights for each sentence of each of the respective plurality of sentences;
ranking, by the processor, a predetermined number of a discrete subset of sentences of each of the respective plurality of sentences according to the weighted sum;
assigning, by the processor, a new weight to the sentences of the discrete subset; and
determining, by the processor, a total weight for a combination of the plurality of summarization engines based upon the new weight and the relative human rank for the sentences of the discrete subset.

14. The combinatorial summarization method of claim 9, selecting at least one of the plurality of summarization engines based on the respective total weight associated with the plurality of summarization engines and at least one additional factor.

15. The combinatorial summarization method of claim 14, wherein the additional factor comprises cost.

16. The combinatorial summarization method of claim 9, further comprising combining the plurality of summarization engines based on the respective total weights to summarize a second plurality of sentences.

17. The combinatorial summarization method of claim 9, further comprising determining an interchangeability of a first and second summarization engine in the plurality of summarization engines based on the comparative respective total weights of the first and second summarization engines.

18. The combinatorial summarization method of claim 9, wherein the relative rank from each of the plurality of summarization engines are different quantitative ranks, and the human rank is a qualitative rank, and the rankings are from the most salient sentence to the least salient sentence, and wherein the human rank does not include ranking sentences of the document that were not ranked by any one of the summarization engines.

19. A combinatorial summarization method, comprising:
determining, by a processor running computer readable instructions embodied on a tangible, non-transitory computer readable medium, i) a sum of weights associated with each sentence of a respective plurality of sentences selected by a plurality of summarization engines from a document, or ii) a weighted sum for each sentence of a respective plurality of sentences selected by a plurality of summarization engines from the document, the sum being based on weights for each of the plurality of summarization engines and weights associated with each sentence of each of the respective plurality of sentences, where each of the summarization engines is a set of different computer readable instructions;
ranking, by the processor, a predetermined number of a discrete subset of sentences of each of the respective plurality of sentences according to i) the sum of weights, or ii) the weighted sum;
assigning, by the processor, a new weight to the sentences of the discrete subset; and
determining, by the processor, a total weight for a combination of the plurality of summarization engines based upon the new weight and a relative human rank for the sentences of the discrete subset.

20. The combinatorial summarization method of claim 19, wherein each of the weights from each of the plurality of summarization engines are different quantitative ranks, and the relative human rank is a qualitative rank, and the rankings are from the most salient sentence to the least salient sentence, and wherein the relative human rank does not include ranking sentences of the document that were not ranked by any one of the summarization engines.

* * * * *

UNITED STATES PATENT AND TRADEMARK OFFICE
CERTIFICATE OF CORRECTION

PATENT NO. : 9,977,829 B2  
APPLICATION NO. : 14/414479  
DATED : May 22, 2018  
INVENTOR(S) : Steven J. Simske et al.

Page 1 of 1

It is certified that error appears in the above-identified patent and that said Letters Patent is hereby corrected as shown below:

In the Specification

In Column 8, Line 40, delete:
" $TW_j = \sum_{i=1}^{N_s} W(i) \times RHR(S(i,j))$ "

And insert:

-- $TW_j = \sum_{i=1}^{N_s} W(i) \times RHR(S(i,j))$ --, therefor.

In Column 11, Line 35, delete:
"$NCW(S) = (i) \times RHR(i)$"
And insert:
-- $NCW(S) = NW(i) \times RHR(i)$ --, therefor.

In Column 11, Line 46, delete:
" $TW_{combo} = \sum_{i=1}^{N_s} NW(i) \times RHR(i)$ "
And insert:

-- $TW_{combo} = \sum_{i=1}^{N_s} NW(i) \times RHR(i)$ --, therefor.

In Column 14, Line 15, delete:
" $Weighted\ Sum = \sum_{j=1}^{N_{summ}} W_j \times W_i$ "
And insert:

-- $Weighted\ Sum = \sum_{j=1}^{N_{summ}} W_j \times W_i$ --, therefor.

Signed and Sealed this  
Fourteenth Day of May, 2019

Andrei Iancu  
*Director of the United States Patent and Trademark Office*